US012454412B2

(12) United States Patent
Gabrieli et al.

(10) Patent No.: US 12,454,412 B2
(45) Date of Patent: Oct. 28, 2025

(54) ORDER FULFILLMENT SYSTEM

(71) Applicant: Aquabot Ltd., Afula (IL)

(72) Inventors: David Shlomo Gabrieli, Ramat Yishai (IL); Shay Gabrieli, Ramat Yishai (IL); Joseph Zvi Porat, Highland Beach, FL (US)

(73) Assignee: Aquabot Ltd., Afula (IL)

( * ) Notice: Subject to any disclaimer, the term of this patent is extended or adjusted under 35 U.S.C. 154(b) by 960 days.

(21) Appl. No.: 17/626,811

(22) PCT Filed: Jul. 8, 2020

(86) PCT No.: PCT/IL2020/050763
§ 371 (c)(1),
(2) Date: Jan. 12, 2022

(87) PCT Pub. No.: WO2021/009746
PCT Pub. Date: Jan. 21, 2021

(65) Prior Publication Data
US 2022/0297941 A1 Sep. 22, 2022

Related U.S. Application Data

(60) Provisional application No. 62/889,626, filed on Aug. 21, 2019, provisional application No. 62/873,914, filed on Jul. 14, 2019.

(30) Foreign Application Priority Data

Mar. 19, 2020 (WO) .................. PCT/IL2020/050328

(51) Int. Cl.
*B65G 1/137* (2006.01)
*B65G 1/04* (2006.01)
(Continued)

(52) U.S. Cl.
CPC ......... *B65G 1/1373* (2013.01); *B65G 1/0457* (2013.01); *B65G 1/0464* (2013.01);
(Continued)

(58) Field of Classification Search
CPC .. B65G 1/1373; B65G 1/0457; B65G 1/0464; B65G 1/04; B65G 1/0492; B65G 1/137; B66C 13/48; B66C 19/00; G06Q 10/087
See application file for complete search history.

(56) References Cited

U.S. PATENT DOCUMENTS 3,847,269 A * 11/1974 Buccicone ......... B65G 21/2018
198/679
5,953,234 A * 9/1999 Singer .................. B65G 1/1378
700/214
(Continued)

FOREIGN PATENT DOCUMENTS

EP 3030504 6/2016
WO WO98/49075 11/1998

OTHER PUBLICATIONS

International Search Report for PCT application No. PCT/IL2020/050328 dated May 20, 2019.
International Search Report for PCT application No. PCT/IL2020/050763 dated Aug. 23, 2020.

*Primary Examiner* — Michael Collins
(74) *Attorney, Agent, or Firm* — PEARL COHEN ZEDEK LATZER BARATZ LLP

(57) ABSTRACT

An order fulfillment system includes a plurality of stock locations for storing items, and movable collection containers, each configured to hold one or more of the items. A network of tracks along which each of the collection containers is configured to move in a single direction includes junctions where at least two of the tracks intersect, each collection container being controllable at a junction to continue travelling along one of the tracks. The network of tracks is configured to enable the collection containers to
(Continued)

move to the stock locations. A controller is configured to receive a list of ordered items, to determine a selected stock location at which each ordered item is stored, to calculate a route along the network of tracks to bring a collection container to each selected stock location, and to control movement of that collection container along the calculated route to the selected stock locations.

4 Claims, 15 Drawing Sheets

(51) Int. Cl.
*B66C 13/48* (2006.01)
*B66C 19/00* (2006.01)
*G06Q 10/087* (2023.01)

(52) U.S. Cl.
CPC .............. *B66C 13/48* (2013.01); *B66C 19/00* (2013.01); *G06Q 10/087* (2013.01)

(56) References Cited

U.S. PATENT DOCUMENTS

| | | | | |
|---|---|---|---|---|
| 8,628,289 | B1* | 1/2014 | Benedict | B65G 1/0478 |
| | | | | 414/217 |
| 9,037,286 | B2 | 5/2015 | Lert | |
| 11,745,944 | B2* | 9/2023 | Zhang | B65G 1/0414 |
| | | | | 414/279 |
| 12,151,894 | B2* | 11/2024 | Austrheim | B65G 1/0492 |
| 2005/0037705 | A1* | 2/2005 | Beeksma | A22C 21/0053 |
| | | | | 452/178 |
| 2005/0145645 | A1* | 7/2005 | Chirnomas | G07F 17/0071 |
| | | | | 221/152 |
| 2016/0019633 | A1* | 1/2016 | Waddington | G06Q 20/203 |
| | | | | 705/26.81 |
| 2016/0130086 | A1* | 5/2016 | Yamashita | B65G 1/06 |
| | | | | 414/807 |
| 2018/0024510 | A1 | 1/2018 | Matsishima et al. | |
| 2020/0407178 | A1* | 12/2020 | Battles | B65G 1/0478 |

* cited by examiner

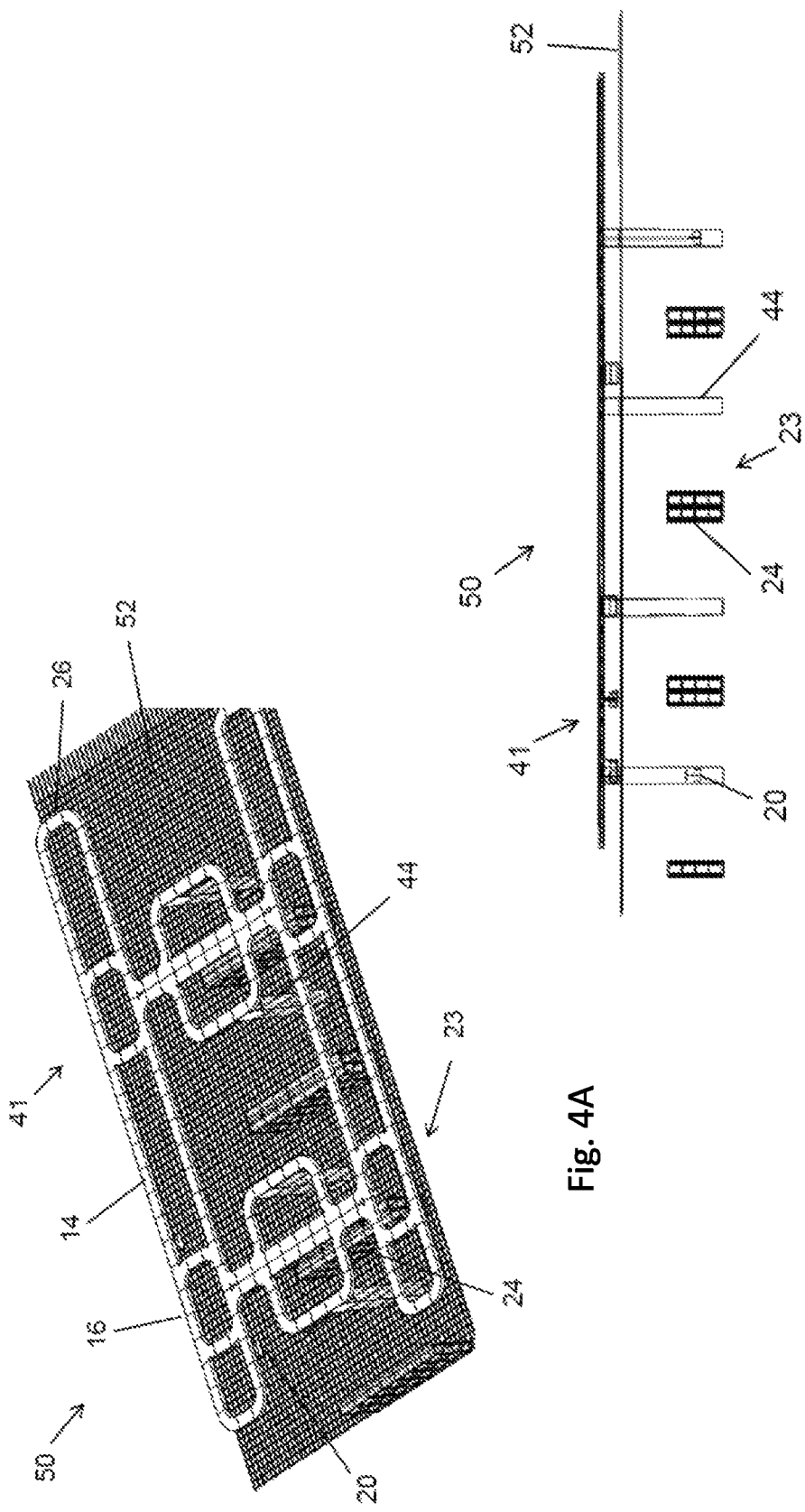

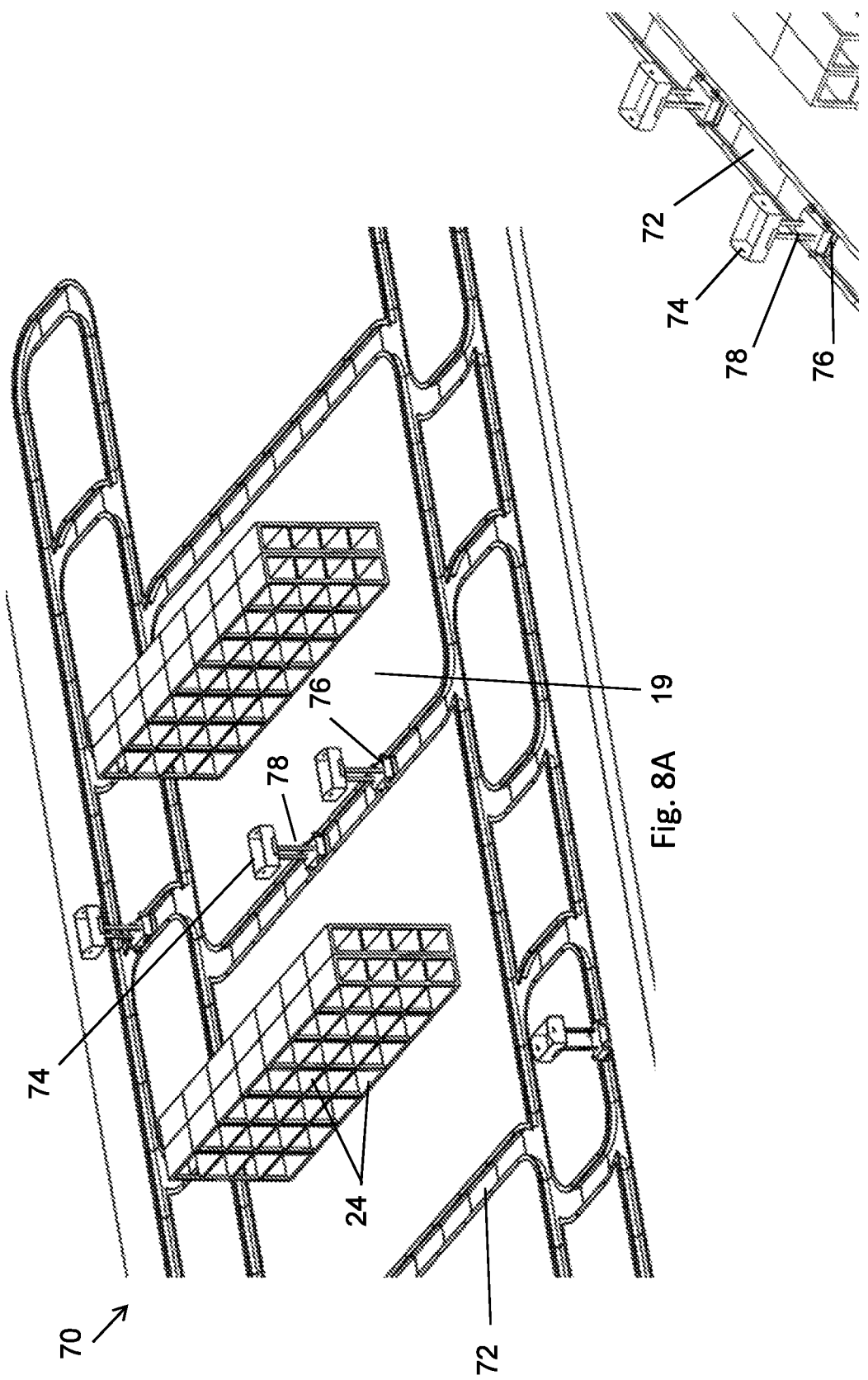

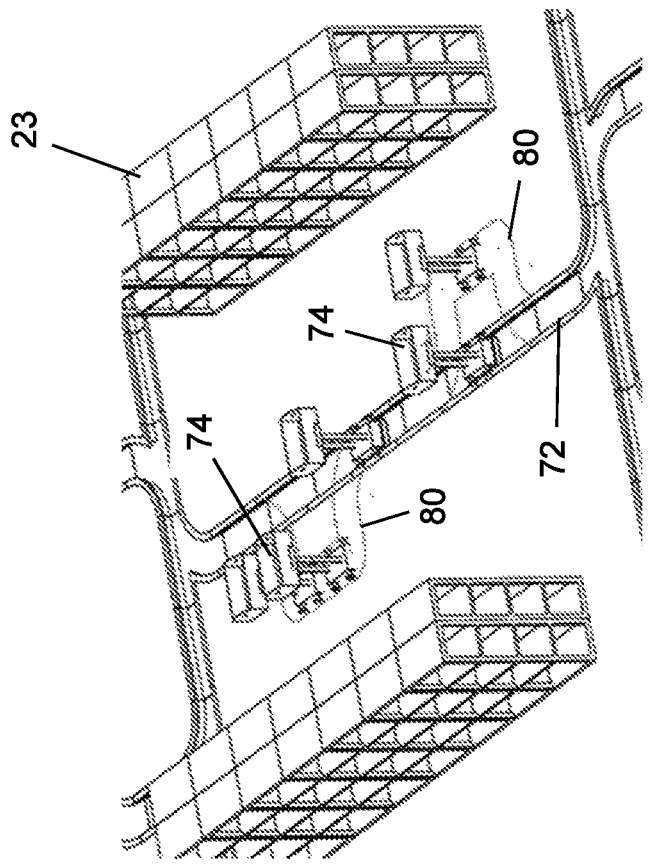
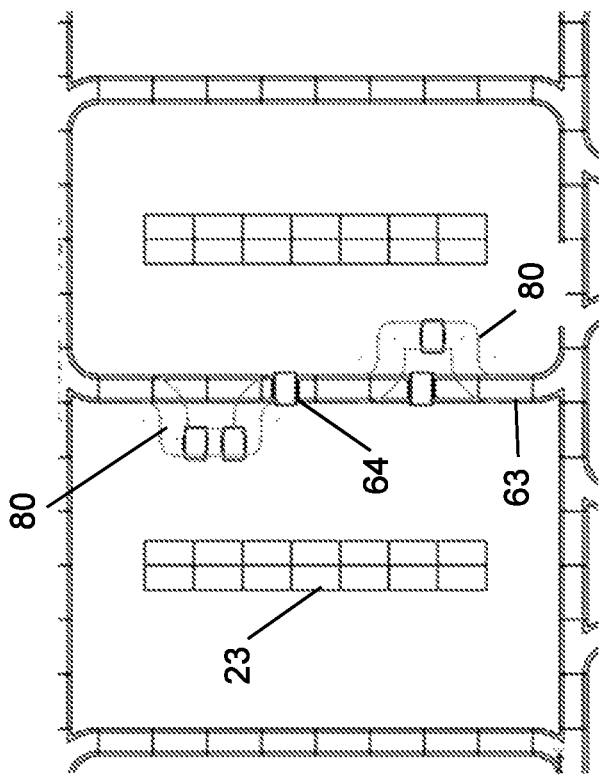
Fig. 9A
Fig. 9B

ORDER FULFILLMENT SYSTEM

CROSS-REFERENCE TO RELATED APPLICATIONS

This application is a U.S. National Phase Application of PCT International Patent Application No. PCT/IL2020/050763 International Filing Date Jul. 8, 2020, claiming the benefit of U.S. Provisional Patent Application No. 62/873,914, filed Jul. 14, 2019, U.S. Provisional Patent Application No. 62/889,626, filed Aug. 21, 2019 and International Patent application No. PCT/IL2020/050328, filed Mar. 19, 2020, all of which are hereby incorporated by reference.

FIELD OF THE INVENTION

The present invention relates to an order fulfillment system.

BACKGROUND OF THE INVENTION

As electronic commerce (e-commerce) increases in popularity, an increasing number of purchasers forgo travelling to stores for shopping. Instead, the purchasers may place orders electronically, e.g., via the internet, or via telephone, or via other networks, with various suppliers of merchandise. The work of collecting the purchased items, packing the items, and transporting the items to the purchaser is left to the suppliers. The purchaser may thus save the time, effort, and expense of travelling to the store, locating desired items within the store, and transporting the purchased items to their destination (e.g., a residence or workplace of the purchaser).

As a result, employees of different types of stores, or other supplier facilities (e.g., warehouses or other storage, packing, production, or other facilities) may spend increasing amounts of time on activities related to processing and fulfilling electronic orders. Such activities may include receiving the order, locating ordered items within the supplier's facility, collecting ordered items from various locations within the facility, preparing collected items for shipment, and delivering the items to the purchaser or to a delivery service.

For example, many customers purchase food electronically from supermarkets and department or warehouse stores. Collecting groceries or other ordered items in a supermarket for fulfilment of a phone or internet order typically requires an employee to roam about the supermarket with a shopping cart and a list of the ordered items, while removing each ordered item from its shelf and placing in the cart. In some cases, the cart may include scanners and weighing scales to enable the employee to check the items that are placed in the cart against the list, while calculating the billed amount. In other cases, the items placed in the cart may undergo a checkout and invoicing procedure.

SUMMARY OF THE INVENTION

There is thus provided, in accordance with an embodiment of the invention, an order fulfillment system including: a plurality of stock locations, each stock location for storing one or a plurality of items; one or a plurality of movable collection containers that are each configured to hold one or more of the items; a network of tracks along which each of the collection containers is configured to move in a single direction, and including a plurality of junctions where at least two of the tracks intersect, each of the collection containers controllable at a junction of the plurality of junctions to continue travelling along one of the at least two of the tracks, the network of tracks configured to enable each of the collection containers to move to the plurality of stock locations; and a controller configured to receive a list of ordered items, to determine a selected stock location of the plurality of stock locations at which each of the ordered items is stored, to calculate a route along the network of tracks to bring a collection container of the one or a plurality of movable collection containers to each selected stock location, and to control movement of that collection container along the calculated route to the each selected stock location.

Furthermore, in accordance with an embodiment of the invention, the network of tracks includes overhead tracks.

Furthermore, in accordance with an embodiment of the invention, a collection container of the one or a plurality of movable collection containers is suspended by a suspension connector from a container mover that is configured to move along the overhead tracks.

Furthermore, in accordance with an embodiment of the invention, the suspension connector has a fixed length.

Furthermore, in accordance with an embodiment of the invention, the suspension connector has a variable length.

Furthermore, in accordance with an embodiment of the invention, the controller is configured to cause the suspension connector to be shortened to raise the suspended collection container when that collection container is being moved along an overhead track of the overhead tracks, and to cause the suspension connector to be lengthened to lower that suspended collection container when that collection container has been moved to one of the selected stock locations.

Furthermore, in accordance with an embodiment of the invention, the system includes a barrier between the overhead tracks and the plurality of stock locations.

Furthermore, in accordance with an embodiment of the invention, the barrier includes one or a plurality of openings through each of which the suspended collection carrier is lowerable to a stock location of the plurality of stock locations.

Furthermore, in accordance with an embodiment of the invention, the system includes one or a plurality of vertical shafts within each of which the suspended collection carrier is lowerable to a lower opening of the shaft.

Furthermore, in accordance with an embodiment of the invention, the network of tracks includes one or a plurality of elevator shafts for lowering a collection container of the one or a plurality of movable collection containers from the overhead tracks to a lower opening of the elevator shaft and for raising a collection container of the one or a plurality of movable collection containers from the lower opening to the overhead tracks.

Furthermore, in accordance with an embodiment of the invention, the one or a plurality of elevator shafts includes at least two elevator shafts, two of the elevator shafts being connected by a conveyor shaft for conveying a collection container of the one or a plurality of movable collection containers from one of the connected elevator shafts to the other.

Furthermore, in accordance with an embodiment of the invention, a collection container of the one or a plurality of movable collection containers is detachable from a container mover that remains attached to the overhead tracks.

Furthermore, in accordance with an embodiment of the invention, the conveyor shaft is substantially horizontal.

Furthermore, in accordance with an embodiment of the invention, the system includes a barrier between the overhead tracks and the plurality of stock locations, wherein a collection carrier of the one or a plurality of movable collection containers is lowerable or raisable through the barrier in the one or a plurality of elevator shafts.

Furthermore, in accordance with an embodiment of the invention, a track of the network of tracks crosses a row of stock locations of the plurality of stock locations in a direction that is substantially perpendicular to an aisle that separates between adjacent stock locations within the row.

Furthermore, in accordance with an embodiment of the invention, the network of tracks includes tracks at a level of a floor.

Furthermore, in accordance with an embodiment of the invention, the network of tracks includes recessed tracks that are below a level of a floor.

Furthermore, in accordance with an embodiment of the invention, a collection container of the one or a plurality of movable collection containers is connected to a container mover that is configured to move along the recessed tracks by a raisable support that is configured to raise that collection container to a level at or above the level of the floor, or to lower that collection container to below the level of the floor.

Furthermore, in accordance with an embodiment of the invention, a track of the network of tracks is branched such that moving a collection container of the one or a plurality of movable collection containers along a side branch of that track brings that collection container to a stock location of the plurality of stock locations.

Furthermore, in accordance with an embodiment of the invention, the system includes a parking area in which a collection container of the one or a plurality of movable collection containers is configured to be parked when not being moved along the network of tracks.

Furthermore, in accordance with an embodiment of the invention, a junction of the plurality of junctions includes a roundabout.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

FIG. 4A schematically illustrates a variant of the order fulfillment system shown in FIG. 3A that includes a safety barrier below the track.

FIG. 4B is a schematic side view of the order fulfillment system shown in FIG. 4A.

FIG. 8A schematically illustrates an example of an order fulfilment system with a track that is below floor level.

FIG. 8B schematically illustrates a raised collection container of the order fulfilment system shown in FIG. 8A.

FIG. 9A schematically illustrates a parking area of an order fulfilment system with recessed tracks.

FIG. 9B schematically illustrates a layout of parking areas of an order fulfilment system with floor level tracks.

DETAILED DESCRIPTION OF EMBODIMENTS

Figure 1A:
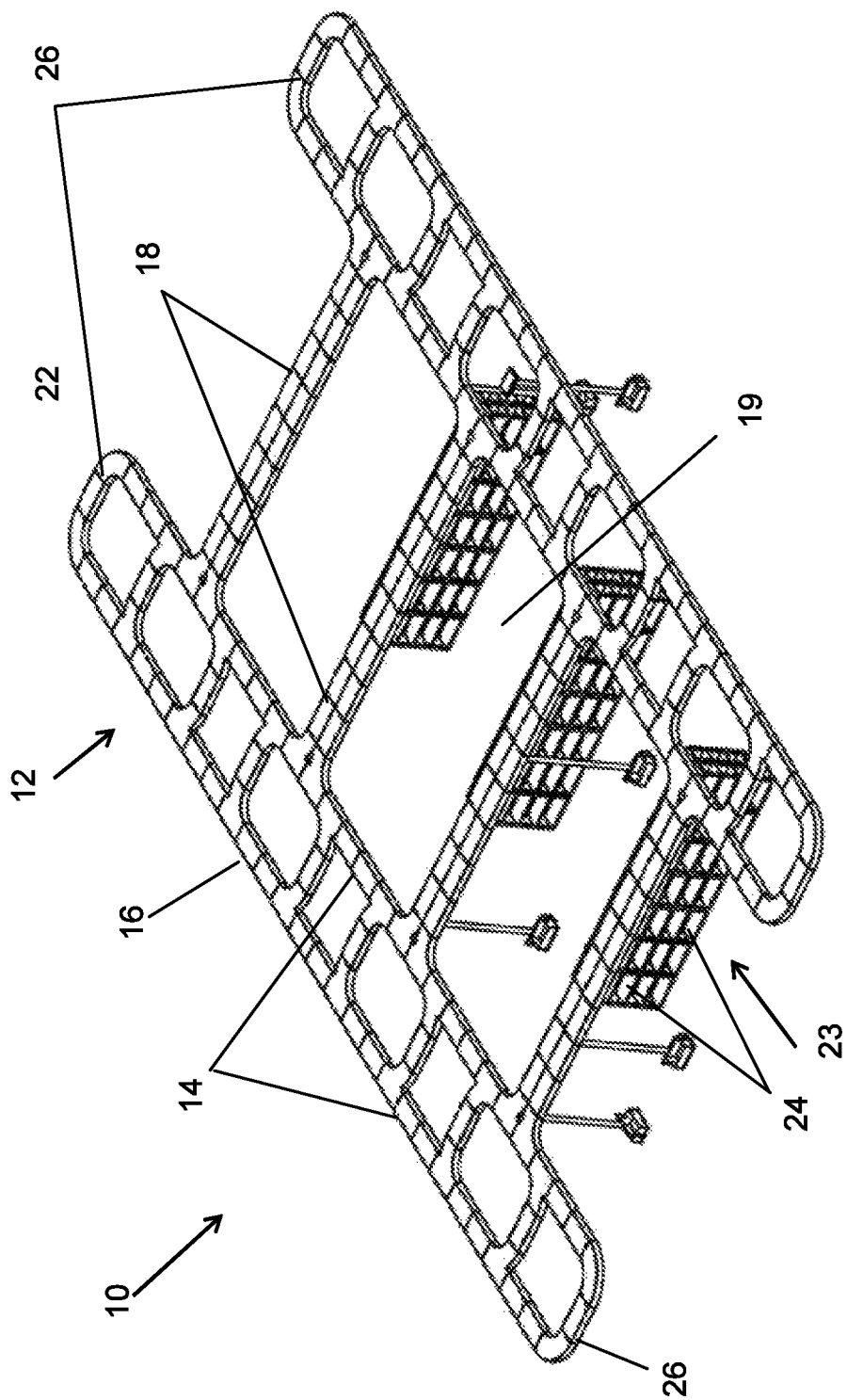
FIG. 1A schematically illustrates an example of an order fulfilment system with an overhead track.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the current invention, an order fulfillment system includes a plurality of collection containers that are configured to move along a network of tracks within a supplier facility. The collection containers are controllable to move within the supplier facility to stock locations at which different supplied items are stocked. A list of various items that is to be placed in each collection container may be provided by a customer who is ordering the items, or may be otherwise generated. A controller is configured to direct movement of each collection container to a stock location of each item that is included in the list along an efficient route. At each stock location, the number of the stocked items that is specified in the list is transferred from the stock location to the collection container. When all items on the list have been transferred to the collection container, the collection container may be controlled to move to a delivery location.

Transfer of an item from the stock location to the collection container may be effected by one or more automated or remotely controlled devices, or by a human attendant. An automated device may include, for example, one or more controllable grabber arms, dispenser gates, chutes, or other automated devices capable of moving an item from the stock location to the collection container, and appropriate to the transferred item (e.g., to its size, weight, structure, fragility, or other properties).

A human attendant may be stationed near a cluster of one or more stock locations to remove ordered items from their storage locations and placing them in the collection container. In particular, in cases where selection of an item may require subjective criteria (e.g., where the item includes fresh produce, fresh or frozen meat, poultry, or fish products, or other items) or sophisticated handling techniques (e.g., cutting to size an ordered length of a wire, cable, or material, mixing dyes into paint, butchering meat, measuring out an ordered weight or volume of an item, or other techniques), or delicate handling, a human attendant may be required. In some cases, a stock location may be provided with an indicator light or other visible or audible signal. The signal may be operated by the controller of the order fulfillment system in order to guide the human attendant to the stock location (e.g., the correct shelf, bin, or other storage location) at which an ordered item is stocked.

A supplier facility may include, for example, a store (e.g., a grocery or department store, either during opening hours in which self-service customers may be present at the stock locations, or after hours in the absence of customers), a warehouse, or other facility in which items that are to supplied may be stored in specified stock locations. The stock locations may include shelves, bins, refrigeration units, stacks, dispensers, or other forms of storage spaces for available items. A location of each stock location may be specified on a three-dimensional coordinate system and stored (e.g., in a database) so as to be available to a controller of the order fulfilment system.

For example, a self-propelled or passively propelled (e.g., by cables, electromagnetically, or otherwise propelled) conveyor mechanism may be controllable to move the collection containers along a network of intersecting tracks. A switching or steering mechanism may control movement of the conveyor mechanism at an intersection between tracks.

For example, a track may consist of a pair of adjacent one-way tracks, each configured to enable motion of collection containers in opposite directions. In some cases, the pair of opposite one-way tracks may be separated from one another, being connected to one another by curved track segments. Junctions of the pair of opposite one-way tracks with an intersecting track (e.g., a one- or two-way stock branch that passes near a group of stock locations) may include a closed loop segment in the form of a traffic circle or roundabout. Such a closed loop junction may enable a collection container to be propelled from one of the one-way tracks to the opposite track, or to an intersecting track.

In some cases, the collection containers may be suspended from an overhead track, e.g., in the form of overhead rails. An elevation mechanism (e.g., a cable of variable length, a telescoping column, or other suspension mechanism capable of changing the height of a suspended object) may be controllable to raise or lower a collection container, e.g., to the height of a stock location (e.g., of a particular shelf). In some cases, a collection container may be lowered from the overhead track, e.g., after removal from the track or from a mover that remains attached to the track, by an elevator.

An order fulfillment system with suspended collection containers may be configured to operate in the presence of people that are not associated with the order fulfillment system, e.g., shoppers, janitorial staff, or other people. These unassociated people may not be trained in operation of the system or assist in operation of the system, and are unlikely to be wearing protective clothing or gear, and may not be aware of movement of the collection containers in order to avoid unintentional encounters with moving components of the system. In such cases, a controller of the system may be programmed for safety precautions. For example, a controller of the order fulfillment system may communicate with one or more types of sensors that may detect the presence of such unassociated people. When the presence of unassociated people is detected, the controller may ensure that all collection containers that are currently in the vicinity of the unassociated people are raised to a height where interaction with the unassociated people is prevented. In some cases, the system may only be operated when such unassociated people are not present (e.g., between the closing and opening times of a store).

In some cases, the tracks may be located in a region of an aisle that is separated by a barrier (e.g., by a wall, fence, or tunnel) from the remainder of the aisle to prevent unassociated people from entering the track area. Thus, the system may operate in the presence of shoppers, janitorial staff, restocking staff, or other people that are not attendants of the system.

In some cases, when the collection containers are raised and being moved or propelled by the conveyor mechanism, the collection containers may be raised above a mesh or other type of horizontal safety barrier. The horizontal safety barrier may be configured to prevent any items that may fall or are spilled from collection containers, or collection containers themselves, from falling onto or near any people (whether unassociated people or staff of the order fulfillment system), equipment, or objects that are present below the horizontal safety barrier. The horizontal safety barrier may be provided with a plurality of openings or shafts to enable the collection containers to be lowered below the barrier to the stock locations.

For example, a collection container may be detachable from its conveyor mechanism. In this example, collection containers may be transported by the conveyor mechanism between the locations of groups of one or more stock locations above the horizontal safety barrier. At the location of an opening or vertical shaft, the collection container may be detached from the conveyor mechanism to be lowered to a level of the stock locations (or of a delivery location) by an elevator mechanism. In some cases, a system of elevator shafts may include horizontal shafts and a horizontal conveyor system that connects two or more vertical shafts and is configured to transport collection containers between the connected vertical shafts.

In other examples, the collection container may be lowered via an opening or shaft while still connected to the conveyor mechanism, e.g., by a cable, rod, or column of variable length.

In other examples, the conveyor mechanism may be controllable to propel the collection containers along low tracks that are approximately at the level of the floor of the supplier facility. For example, the floor-level tracks may consist of one or more rails or channels that are configured to guide motion of the collection containers. In other cases, the floor-level tracks may consist of roadways or aisles along which the collection containers may be propelled as guided by a guidance and steering mechanism. As used herein, a floor-level track refers to a track on which collection containers are supported from below at a height where placement of items into the collection container by a person who is standing on the floor, or by a device (e.g., robotic arm) that is mounted to the floor, without raising or lowering the collection container. In some cases, a floor-level track may be elevated at a height between 50 centimeters and one meter (or another height) above the floor. The floor-level track may, in actuality, be located above or below a floor (e.g., at a depth below floor level that is less than the height of the collection container) along which people or other vehicles may move among stock locations.

In other examples, the conveyor mechanism may propel the collection container on a level or floor that is below a level on which the stock locations are located. In this case, the collection container may be raised to the level of the stock locations via openings or shafts in a floor that is below the stock location level. In these examples, the track and collection containers may be covered at times when people that are not affiliated with the order fulfillment system (e.g., shoppers in a store) are present.

In some cases, a track may be branched. For example, one branch may enable a collection container to be propelled directly from one intersection along the track to another. One or two side branches of the track may serve as service branch tracks to enable the collection container to be moved close to stock locations that are arranged along one or both sides (respectively) of the track.

In some cases, parking areas may be provided, e.g., branching off of and adjacent to a track. For example, a collection container may be conveyed to a parking area when an extended amount of time is required to place ordered items into that collection container. For example, an extended amount of time may be required when an item is to be selected, measured out, assembled, cut to size, mixed, treated (e.g., cooked or baked), or otherwise processed prior to placement in the collection container. Parking of the collection container in the parking area may prevent interference with the movement of other collection containers along the adjacent track. In other examples, a collection container may wait in a standby configuration in a parking area during periods when that collection container is not needed for collection of ordered items from stock locations, when being serviced, or when waiting during placement of ordered items in another collection container.

Empty collection containers may be placed on the track, or filled collection containers may be removed from the track, at logistic segments of the track. For example, a logistic segment may be located at a curved track segment that connects opposite one-way tracks, or may be located elsewhere.

An order fulfillment system as described herein may be advantageous over previously described systems in which an employee manually moves a cart about a facility (e.g., a supermarket or warehouse) to select ordered items for placement into the cart. Such an employee may spend a lot of time moving the cart from location to location within the facility. In a facility (e.g., a supermarket or department store) where other shoppers may be present, the employee filling the order may interfere with these other shoppers. On the other hand, an order fulfillment system as described herein enables a collection container to automatically navigate along a track to the stock location of each ordered item. In the case where the track is located overhead or below the floor level, this movement of the collection container does not interfere with the movement of other shoppers. In some cases, the other shoppers may not be aware of the presence of the collection containers. The system may thus minimize or eliminate the need for an employee to move along with the collection container, increasing the efficiency of order fulfillment.

A controller may direct the collection containers only to those stock locations from which ordered items are to be taken. A calculated route for the collection container may thus bypass all other parts of the facility. An automated inventory system that is associated with the order fulfillment system may indicate when an ordered item is out of stock. Thus, the order fulfillment system may cause the collection container to bypass the stock locations of the out of stock items.

An order fulfillment system as described herein may enable more efficient use of personnel than the previously described systems. A human attendant of the order fulfillment system may be assigned to a limited region of the facility. Thus, the attendant need not move around the facility and may become very familiar with the assigned region. In some cases, the attendant may be notified of the required items, e.g., by a monitor, prior to arrival of the collection container. Thus, the attendant may be able to gather some of the ordered items in advance. A scanner on the collection container (e.g., a bar code or other optical scanner, a radiofrequency identification (RFID) scanner, or other scanner capable of identifying an item) may be configured to notify the attendant in the event that the wrong item was placed in the collection container, thus enabling the attendant to rectify the situation in a timely manner. For example, a visible or audible signal may be generated to alert the attendant to the error, or to direct the attendant to the correct item.

Figure 1B:
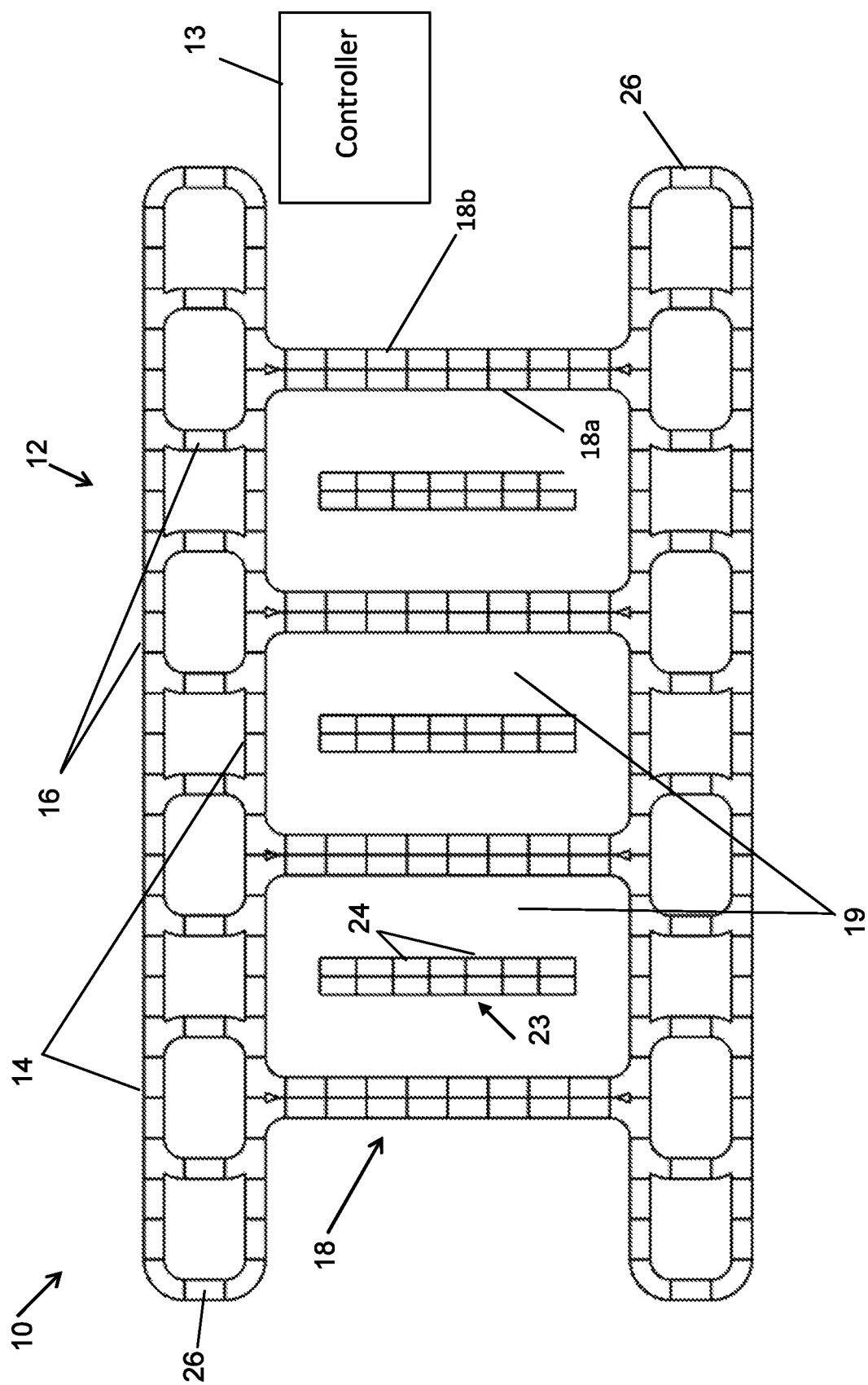
FIG. 1B is a schematic layout of the order fulfilment system shown in FIG. 1A.
Figure 1C:
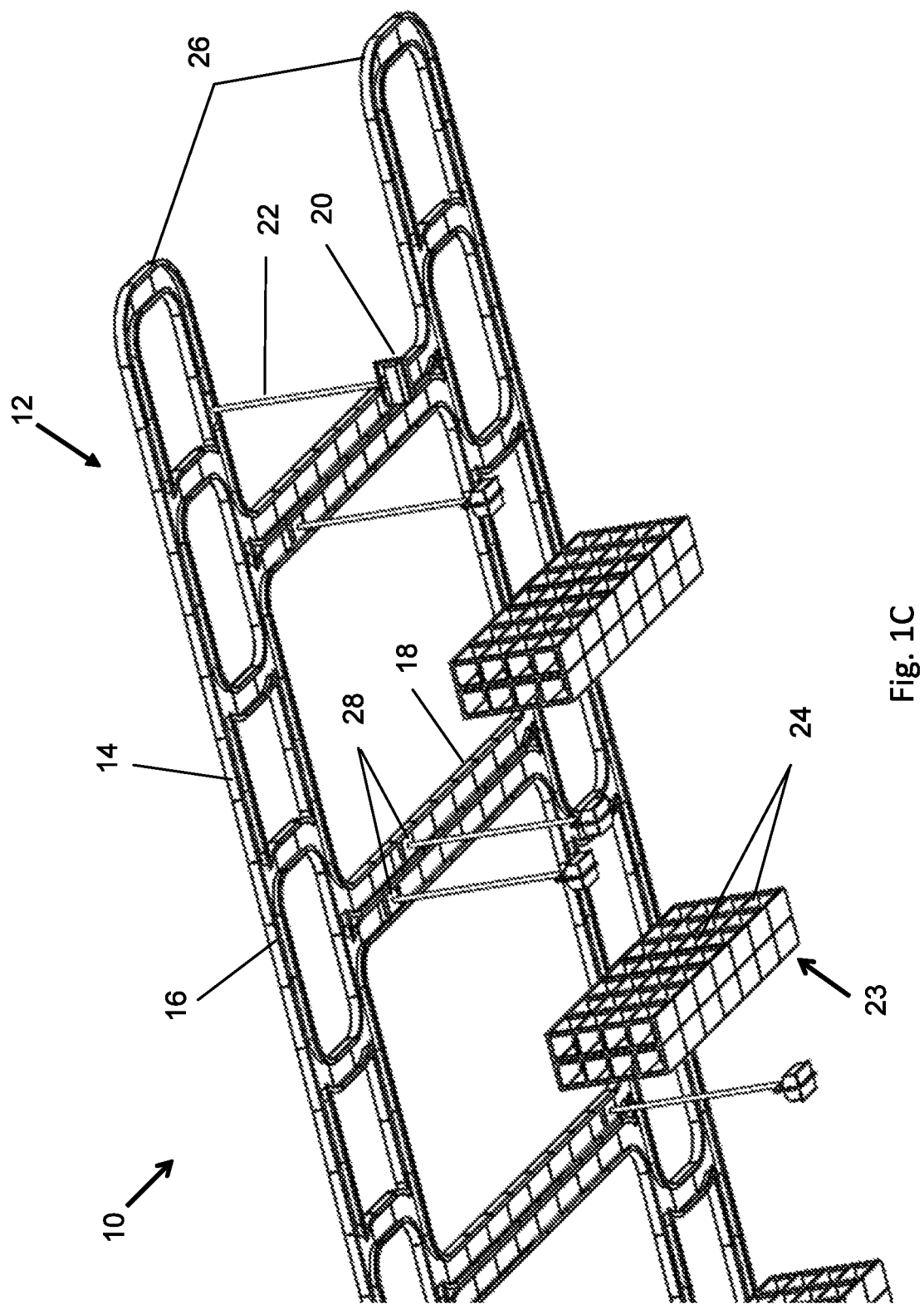
FIG. 1C is schematically illustrates part of the order fulfilment system shown in FIG. 1A as viewed from below the track.

FIG. 1A schematically illustrates an example of an order fulfilment system with an overhead track. FIG. 1B is a schematic layout of the order fulfilment system shown in FIG. 1A. FIG. 1C is schematically illustrates part of the order fulfilment system shown in FIG. 1A as viewed from below the track.

Order fulfillment system 10 includes an overhead track network 12. A plurality of collection containers 20 are configured for transport along overhead track network 12. Motion of collection containers 20 along overhead track network 12 may be controlled by controller 13. The motion of collection containers 20 may bring each collection container 20 to the vicinity of one or more stock locations 24. Each stock location 24 may include a stock of one or more items of a particular type. For example, a stock location 24 may include one or more shelves, bins, stacks, or other arrangement of items for ordering.

For example, controller 13 may include a central controller, e.g., including a computer, or a plurality of controller devices (e.g., including a processor unit) where at least some of the controller devices intercommunicate. For example, controller 13 may receive a list of items that were ordered by a customer of a facility (e.g., a store or warehouse). Controller 13 may identify a selected stock location 24 for each ordered item on the list. Controller 13 may then calculate a route along overhead track network 12 to bring a collection container 20 sequentially to each of the selected stock locations 24. Controller 13 may then cause one or more collection containers 20 to move along overhead track network 12 along the route to each of the selected stock locations 24. Controller 13 may select an optimized route along which each collection container is to be moved. For example, controller 13 may select a route with minimum travel time or shortest distance travelled. The calculation may take into account the amount of time and effort required for loading ordered items from each stock location 24. Controller 13 may communicate with one or more input or output devices, and with components of order fulfillment system 10, via one or more wired or wireless connection or communication channels.

In some cases, e.g., when many items have been ordered in a single order, more than one collection container 20 may be directed to the selected stock locations 24. For example, one collection container 20 may be directed to some of the selected stock locations 24 (e.g., that are located in a single region of the facility), while one or more other collection containers 20 are directed to the other selected stock locations 24. In other cases, two or more collection containers 20 may be moved in tandem (e.g., either coupled to one another or moving in close proximity to one another) to the same selected stock locations 24.

At each stock location 24, one or more ordered items may be placed within a collection container 20 for collection of the ordered items. For example, a mechanical device (e.g., including a robotic arm, dispenser, or other device) may be configured to be automatically or remotely controlled to move an ordered item from a stock location 24 to a collection container 20. In another example, a human attendant may move an ordered item from a stock location 24 to a collection container 20.

In the example shown, each collection container 20 is suspended from a container mover 28 by suspension connector 22. Container mover 28 is confined to move along a track of overhead track network 12. In some cases, a container mover 28 may be motorized, e.g., with motorized drive wheels, or otherwise capable of self-propulsion. Power for self-propulsion may be provided, e.g., by electrified wires or rails that are embedded into overhead track network 12. In other cases, each container mover 28 may be propelled by an external mechanism. For example, such an external mechanism may include an electromagnetic propulsion mechanism (e.g., by electromagnets embedded in overhead track network 12), a system of moving cables running along track segments of overhead track network 12, or otherwise.

In some cases, suspension connector 22 may have a fixed length. For example, the fixed length may suspend collection container 20 at a convenient height relative to stock locations 24, aisle 19, or other elements of order fulfillment system 10. In some cases, suspension connector 22 may have a variable length. For example, suspension connector 22 may include a telescoping arm or column of variable length, e.g., hydraulically, pneumatically, electromagnetically, mechanically, or otherwise controlled or actuated. As another example, suspension connector 22 may include a cable of variable length, e.g., controlled by a reel or pulley system configured to change the length of the cable between container mover 28 and collection container 20.

For example, when order fulfillment system 10 operates in a facility where unaffiliated people that are not associated with order fulfillment system 10 may be present (e.g., in a store or self-service warehouse, e.g., in an aisle 19), suspension connector 22 may be shortened to raise collection container 20 above the heads of the unaffiliated people when container mover 28 is moving along overhead track network 12. When collection container 20 has been moved to a point of overhead track network 12 that is above a stock location 24 (or location near that stock location 24) at which an item is to be loaded into collection container 20, suspension connector 22 may be lengthened to lower collection container 20 to the height of that stock location 24. An automatic sensor system or a manual confirmation (e.g., by a human attendant of order fulfillment system 10) may prevent lowering of collection container 20 in the vicinity of the unaffiliated people.

Each collection container 20 may be provided with a sensor that senses each item that is placed in that collection container 20. For example, the sensor may include a barcode reader, a radiofrequency identification (RFID) tag reader, an imaging device (e.g., wherein controller 13 is configured for machine vision identification), or another sensor system that is configured to identify items that are placed into collection container 20. Controller 13 may be configured to check a placed item against a list of ordered items. Thus, controller 13 may be configured to maintain a record of which ordered items have already been placed into collection container 20, and which remain to be obtained at stock locations 24. A sensor may include a weighing scale, volume sensor, or other sensor that indicates a quantity of an item. Controller 13 may be configured to calculate an itemized listing of the price of the items placed in collection container 20. Where ordered items are to be placed in two or more collection containers 20, controller 13 may produce a combined list of the items placed in all of the collection containers 20 that are associated with a single order.

In some cases, a plurality of stock locations 24 may be located together in a stock cluster 23. For example, a stock cluster 23 may include a shelving unit that is divided into a group of individual shelves or sections, each one functioning as a stock location 24. In the case of a facility in the form of a store or warehouse, stock clusters 23 may be arranged on either side of an aisle 19. In the example shown, a two-way stock track segment 18 passes between stock clusters 23, e.g., along a center of aisle 19.

In some examples, a stock location 24 may be provided with an indicator signal to indicate the stock location 24 at which an ordered item is stocked. For example, the indicator signal may include a visible signal (e.g., a light source, colored flag or tab, text display, or another type of visible indicator) or an audible signal (e.g., tone, bell, or other audible signal). The indicator signal may continue to operate until a sensor has detected placement of an ordered number of items, or an ordered quantity of an item, into collection container 20.

In the example shown, each two-way stock track segment 18 includes two one-way tracks 18a and 18b that are each configured for one-way motion of a container mover 28. In the example shown, one-way tracks 18a and 18b are adjacent to one another. In other examples, one-way tracks 18a and 18b may be separated from one another by a space (e.g., such that one-way track 18a is located near a stock cluster 23 on one side of two-way stock track segment 18, while one-way track 18b is located near a stock cluster 23 on the opposite side of two-way stock track segment 18, or otherwise).

In the example shown, connection tracks 14 enable a container mover 28 to move from one two-way stock track segment 18 to another while bypassing stock locations 24. In the example shown, each connection track 14 is in the form of a pair of one-way tracks (configured to enable movement of collection containers 20 in opposite directions) that are separated from one another. Each junction 16 between a connection track 14 and an intersecting two-way stock track segment 18 is in the form of a roundabout. Thus, when a container mover 28 reaches a junction 16 while moving along a one-way track of a connection track 14, that container mover 28 may continue along that same one-way track, or switch to the intersecting two-way stock track segment 18 or to the opposite one-way track of that connection track 14. Similarly, a container mover 28 that reaches a junction 16 while moving along a one-way track 18a or 18b of a two-way stock track segment 18 may continue to either one-way track of the intersecting connection track 14, or to the opposite one-way track 18b or 18a, respectively, of that two-way stock track segment 18. In other examples, a junction may have another form (e.g., a T-shaped junction, a turntable, or other form of junction). A direction of continued motion of a container mover 28 at a junction 16 may be controlled by controller 13. For example, junction 16 may include a remotely controlled (e.g., electromagnetically controlled) switching mechanism. As another example, container mover 28 may include a remotely controlled steering mechanism for determining the continued motion of container mover 28 at a junction 16.

In the example shown, each connection track 14 terminates in a terminal connector 26 that connects the separate one-way tracks of connection track 14. Thus, a container mover 28 that moves along a one-way track of connection track 14 to terminal connector 26 may reverse direction and continue travelling along the opposite one-way track of that connection track 14. In some examples, a loading zone for placing an empty collection container 20 onto overhead track network 12, or for removing a filled collection container 20 from overhead track network 12 (e.g., for delivery to the customer who placed the order) may be located at (e.g., on the same level as or below) terminal connector 26. In other examples, a loading zone may be located elsewhere along overhead track network 12.

Figure 2:
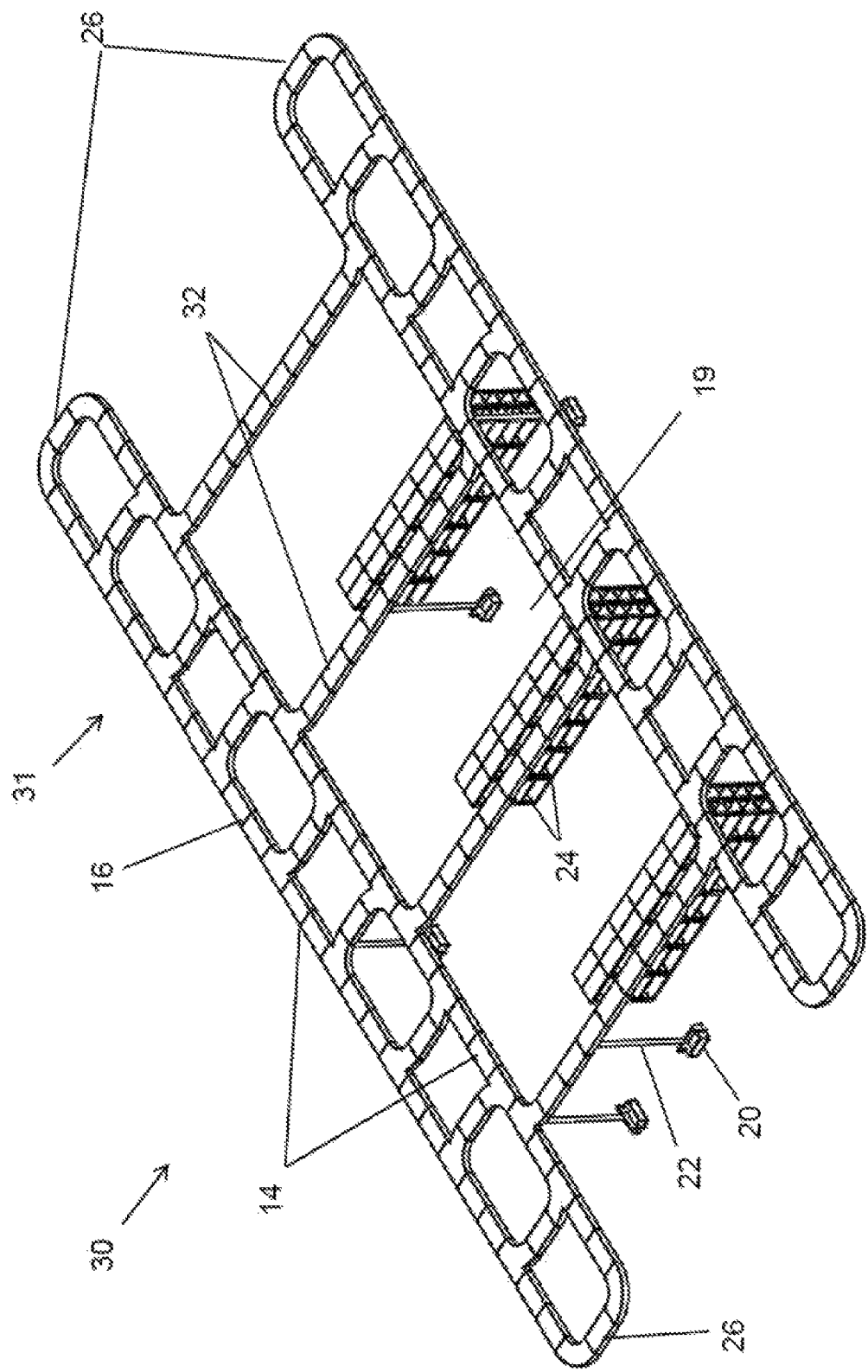
FIG. 2 schematically illustrates a variant of the order fulfilment system shown in FIG. 1A, configured for one-way movement along all track segments.

FIG. 2 schematically illustrates a variant of the order fulfilment system shown in FIG. 1A, configured for one-way movement along track segments.

In overhead track network 31 of order fulfillment system 30, one-way stock track segments 32 are arranged between connection tracks 14. Thus, all container movers 28 that travel along each one-way stock track segment 32 (e.g., between stock clusters 23 along aisles 19) are confined to travel in a single direction.

Figure 3A:
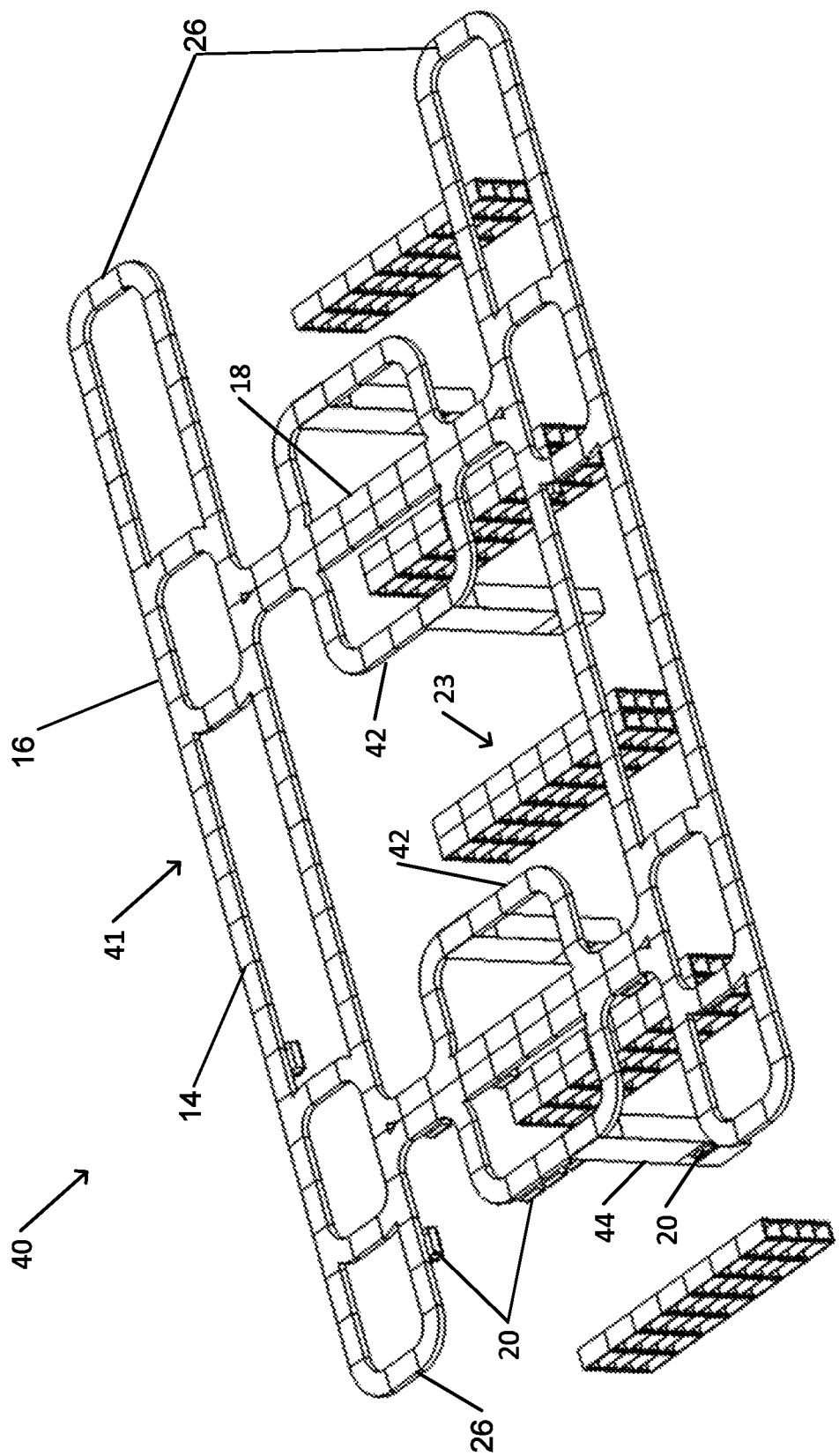
FIG. 3A schematically illustrates a variant of the order fulfillment system shown in FIG. 1A that includes vertical shafts for the lowering of collection containers.
Figure 3C:
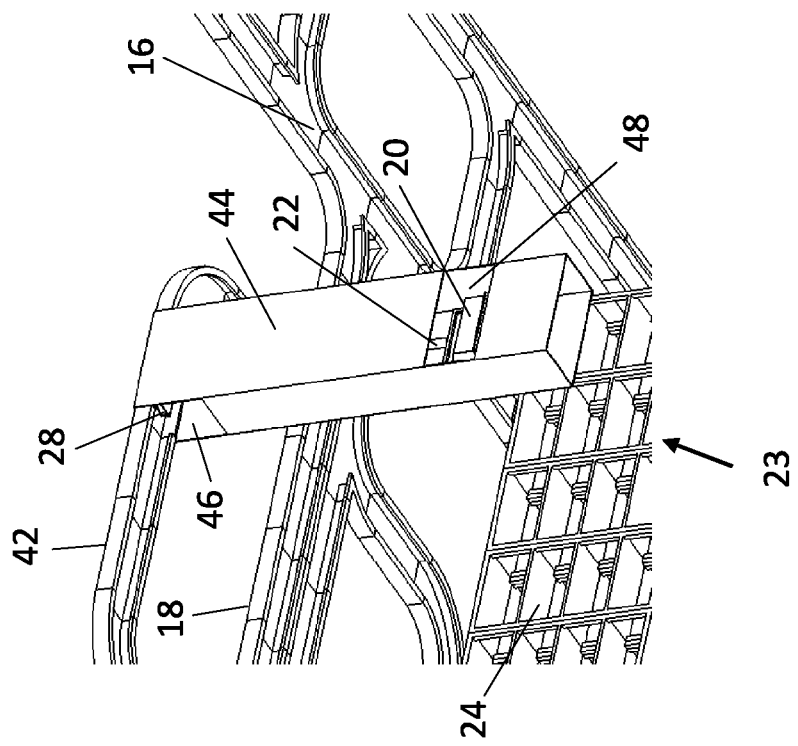
FIG. 3C is a schematic view from below the overhead track of the vertical shaft shown in FIG. 3B.
Figure 3B:
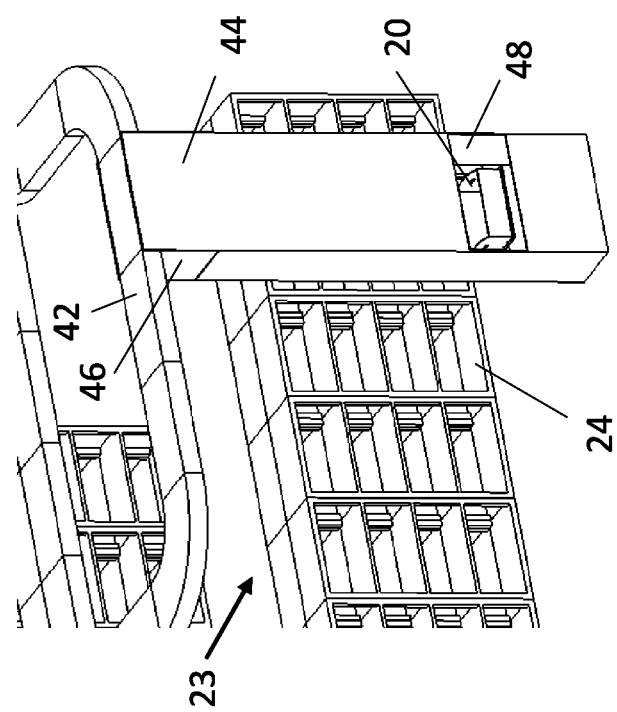
FIG. 3B schematically illustrates a vertical shaft of the order fulfillment system shown in FIG. 3A.

FIG. 3A schematically illustrates a variant of the order fulfillment system shown in FIG. 1A that includes vertical shafts for the lowering of collection containers. FIG. 3B schematically illustrates a vertical shaft of the order fulfillment system shown in FIG. 3A. FIG. 3C is a schematic view from below the overhead track of the vertical shaft shown in FIG. 3B.

In order fulfillment system 40, overhead track network 41 includes a plurality of vertical shafts 44. Each vertical shaft 44 is located in the vicinity of one or more stock locations 24. One or more collection containers 20 may be lowered from overhead track network 41 within vertical shaft 44 to a lower height. For example, the lower height may include a height where collection container 20 is readily accessible to a person or robotic arm that is located on a floor near stock location 24. For example, vertical shaft 44 may be located sufficiently close to a stock location 24 to facilitate transfer of an item from that stock location 24 to a collection container 20 by a human attendant or robotic device. When collection container 20 is not lowered within vertical shaft 44, collection container 20 may be held at a raised height near overhead track network 41. Typically, the raised height is sufficiently high to prevent collection containers 20 from interfering with the function and movement of people and equipment that are located, e.g., on a floor or elsewhere, near stock locations 24.

In some examples, lowering collection container 20 within vertical shaft 44 may be effected by extending the length of a suspension connector 22 that connects collection container 20 to a container mover 28 that is fixed to overhead track network 41. In this case, container mover 28 may be stationed at the top of vertical shaft 44 as collection container 20 is lowered to the bottom of vertical shaft 44.

In other examples, collection container 20 may be detachable from, and attachable to, a container mover 28 that remains fixed to overhead track network 41. In this example, when container mover 28 moves collection container 20 to the top of vertical shaft 44, collection container 20 may be detached from container mover 28 and lowered by an elevator mechanism that operates within vertical shaft 44.

In other examples, collection container 20 and an attached container mover 28 may be removed from overhead track network 12 at the top of vertical shaft 44 and lowered by an elevator mechanism within vertical shaft 44.

For example, when one or more ordered items are to be placed into a collection container 20 from one or more stock locations 24, container mover 28 may be operated to move itself and its attached collection container 20 via an upper opening 46 into a vertical shaft 44 that is near or nearest to those stock locations 24. Collection container 20 may then be lowered via one of the mechanisms described above, or via another mechanism, to a lower opening 48 of vertical shaft 44. When at lower opening 48, ordered items may be transferred by a human attendant or by an automatic or remotely controlled (e.g., robotic) mechanism from those stock locations 24 to collection container 20. When all of the ordered items are transferred from stock locations 24 to collection container 20, collection container 20 may be raised within vertical shaft 44 to overhead track network 12.

Container mover 28 may then be operated to move collection container 20 out of vertical shaft 44 via upper opening 46.

Figure 5:
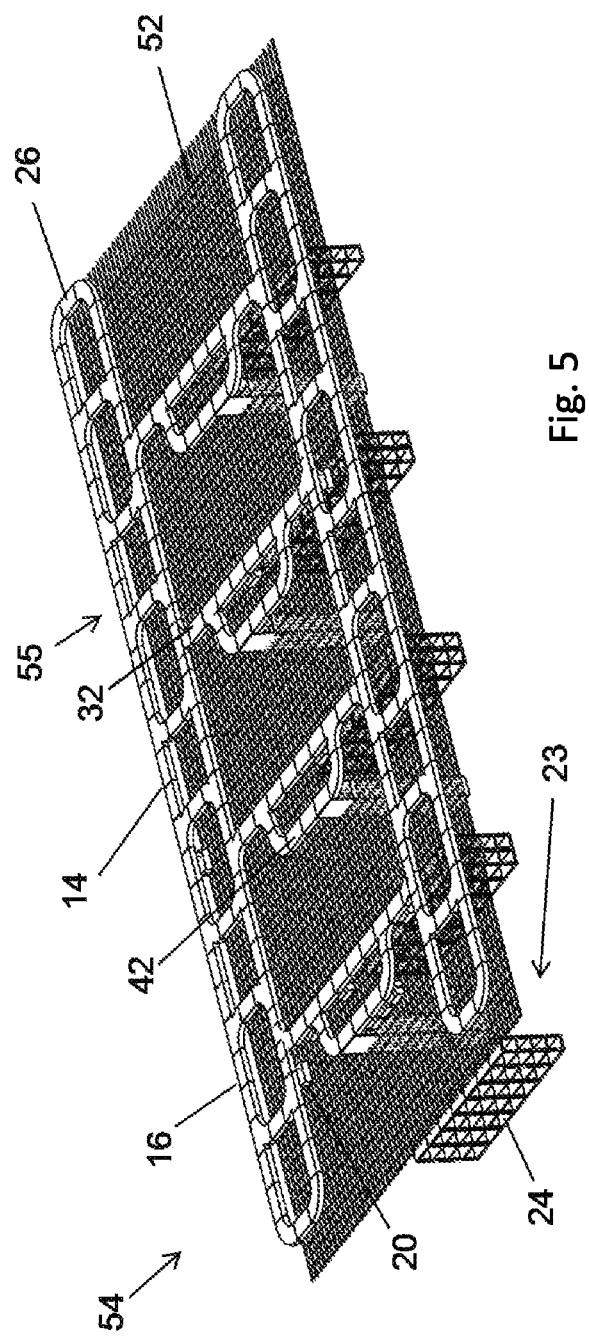
FIG. 5 schematically illustrates a variant of the order fulfillment system shown in FIG. 4A with a single service track branch along each that includes a horizontal safety barrier below the track.

In the example shown, each vertical shaft 44 is located along a side branch track 42 that branches off of either side of two-way stock track segment 18. For example, two-way track segment 18 may be positioned along the midline of an aisle 19, while each side branch track 42 may run close to a stock cluster 23 on either side of that aisle 19. Other arrangements of side branches (e.g., as shown in FIG. 5 or otherwise) are possible.

In the example shown in FIG. 3A, tracks of overhead track network 41 are configure to enable movement of collection containers 20 between or parallel to stock clusters 23 or aisles 19 between stock clusters 23. In some cases, an overhead track network may be configured to reduce travel time within of a collection container within the network, as well as fulfillment of an order by transfer of items from a stock cluster 23 to a collection container 20, by enabling collection containers 20 to travel across stock clusters 23 and aisles 19.

Figure 3D:
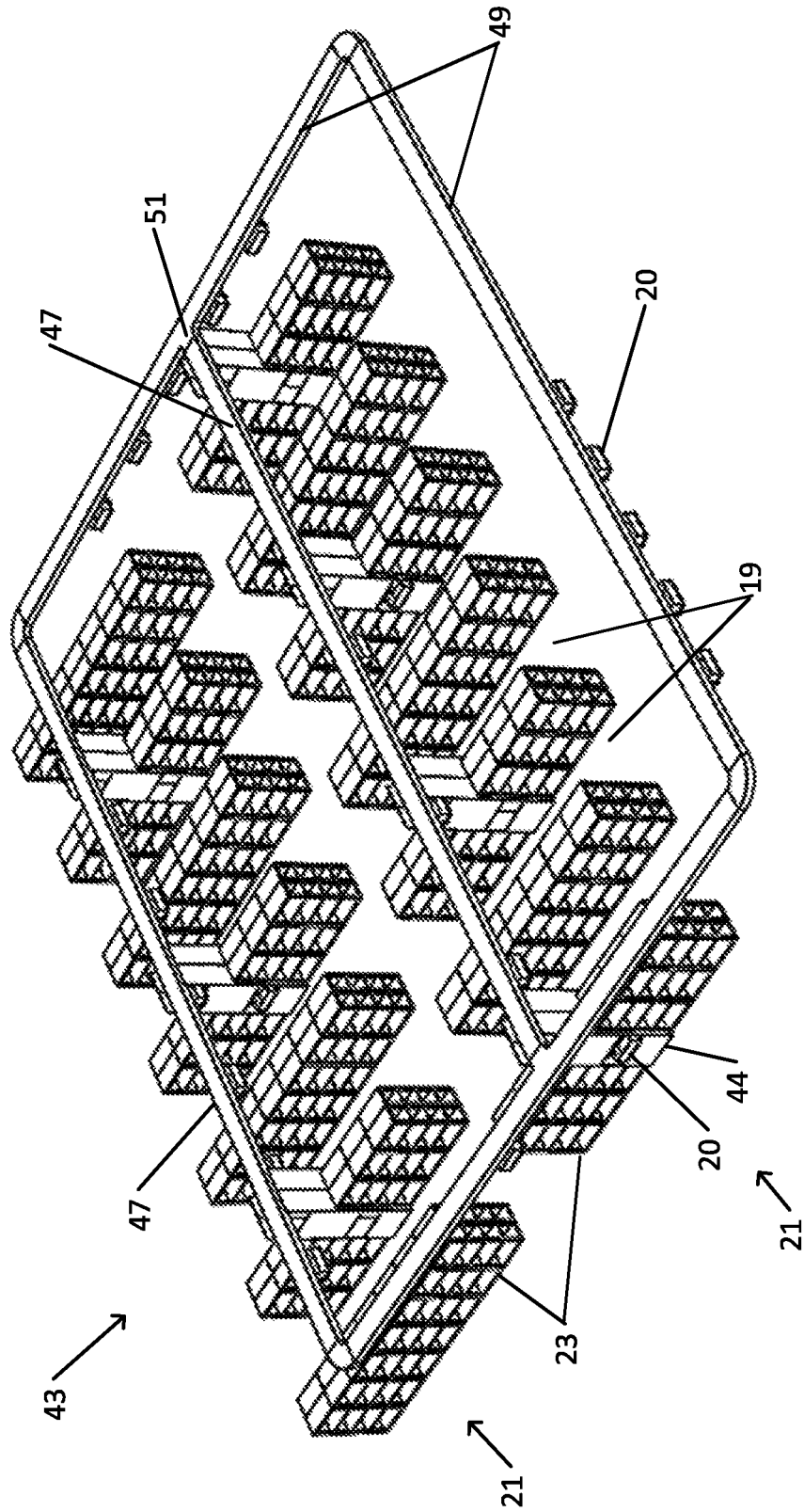
FIG. 3D schematically illustrates a variant of the order fulfillment system shown in FIG. 3A in which overhead tracks cross stock clusters.
Figure 3E:
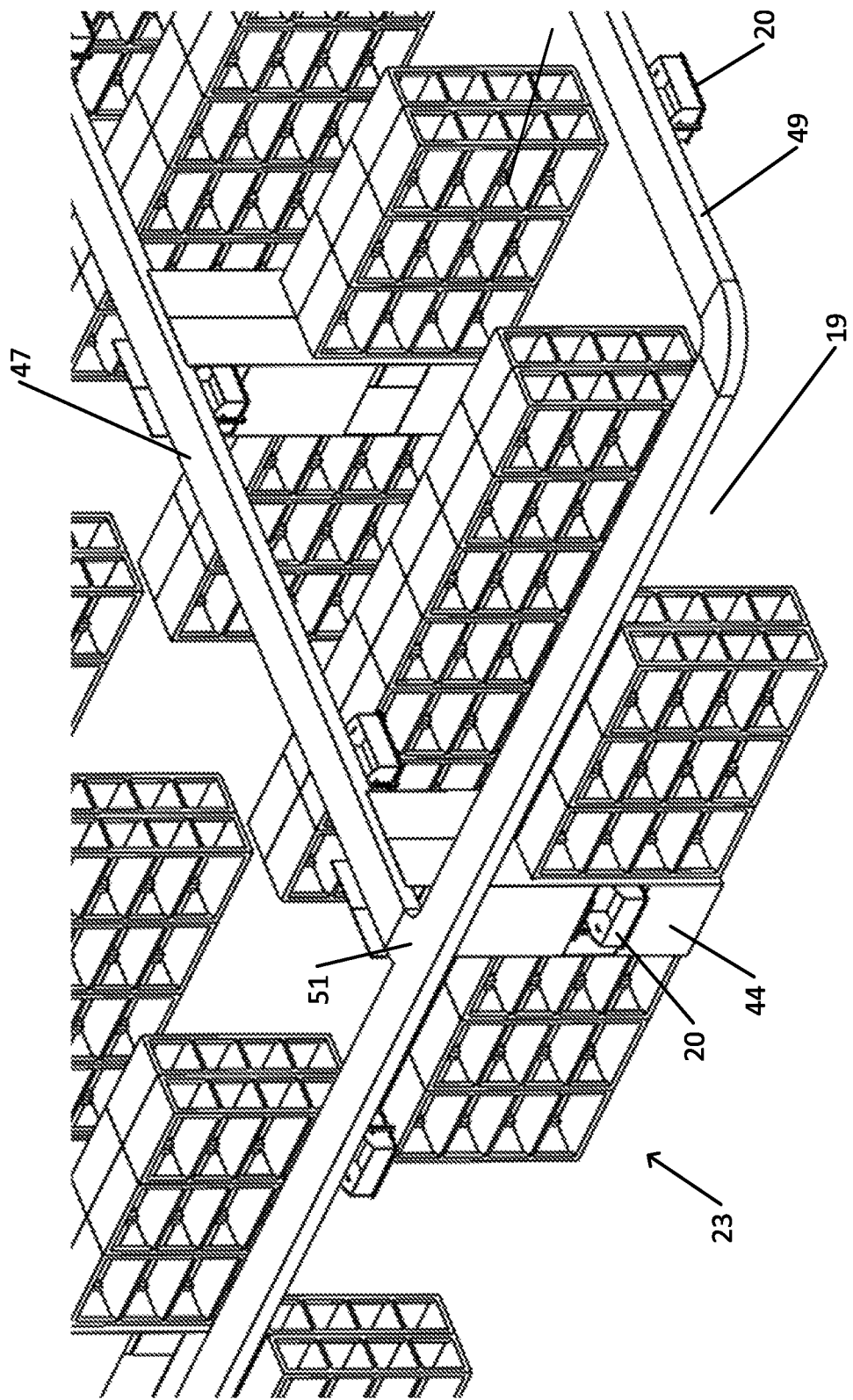
FIG. 3E schematically shows details of the order fulfillment system shown in FIG. 3D.

FIG. 3D schematically illustrates a variant of the order fulfillment system shown in FIG. 3A in which overhead tracks cross stock clusters. FIG. 3E schematically shows details of the order fulfillment system shown in FIG. 3D.

In overhead track arrangement 43, each stock track 47 is arranged to cross above a row 21 of stock clusters 23. In the example shown, each stock track 47 is oriented substantially perpendicular to stock clusters 23 in a row 21, and to aisles 19 that separate stock clusters 23 within row 21. In other examples, a stock track 47 may cross stock clusters 23 and aisles 19 at an oblique angle.

At the point where each stock track 47 crosses a stock cluster 23, a vertical shaft 44 is provided to enable a collection container 20 to be lowered from that stock track 47 to a level at which items from that stock cluster 23 may be placed into the lowered collection container 20. In this manner, route that is travelled by a collection container 20 to a stock cluster 23 may be more direct than in other track arrangements.

One or more connection tracks 49 may enable a collection container 20 to travel from one stock track 47 to another, e.g., at the periphery of overhead track arrangement 43, as shown, or otherwise. Typically, a loading zone for removing a collection container 20 from overhead track arrangement 43, for removing the contents of a collection container 20, for introducing a collection container 20 onto overhead track arrangement 43, or for performing other actions, may be located along a connection track 49. In addition, a segment of a connection track 49 may be utilized for storing or parking of empty collection containers 20 prior to their being sent to stock clusters 23 for loading.

A collection container 20 may be directed from a connection track 49 to a stock track 47, or from a stock track 47 to a connection track 49, at a junction 51. In the example shown, all tracks of overhead track arrangement 43 are configured to enable one-way motion of collection containers 20. In other examples, one or more tracks of overhead track arrangement 43 may be configured (e.g., with two parallel tracks) to enable two-way movement of collection containers 20 along that track. In the example shown, connection track 49 is located at the periphery of overhead track arrangement 43. In other arrangements, a connection track may be located elsewhere (e.g., along an aisle 19).

FIG. 4A schematically illustrates a variant of the order fulfillment system shown in FIG. 3A that includes a safety barrier below the track. FIG. 4B is a schematic side view of the order fulfillment system shown in FIG. 4A.

Order fulfillment system 50 includes safety barrier 52 between overhead track network 41 and a lower region that includes stock clusters 23 and stock locations 24. Safety barrier 52 may be designed so as to catch any items that fall out of a collection container 20 that is travelling along overhead track network 41, or a collection container 20 and container mover 28 that detaches from overhead track network 41, or any part of collection container 20, container mover 28, or overhead track network 41. Thus, people and equipment that are located below safety barrier 52 may be protected from falling items or equipment.

Safety barrier 52 may be horizontal as shown, or may be sloped, bent or curved. Safety barrier 52 may be made of a mesh (e.g., as shown), of a transparent material, of a nontransparent material provided with windows (e.g., so as to enable visible monitoring of movement of collection containers 20 along overhead track network 41), or of a nontransparent material.

FIG. 5 schematically illustrates a variant of the order fulfillment system shown in FIG. 4A with a single service track branch along each that includes a horizontal safety barrier below the track.

In the example shown of order fulfillment system 54, overhead track network 55 includes only one-way track segments, including one-way stock track segments 32 (e.g., as in overhead track network 31 in FIG. 2). In this example, a single side branch track 42 branches off of each one-way stock track segments 32.

In other examples, other track networks are possible. For example, two side branch tracks 42 may branch off of opposite sides of a one-way stock track segments 32, or a single side branch track 42 may branch off of one side of a two-way stock track segment 18. Vertical elevator shafts 45 may be arranged along a one-way stock track segments 32, a two-way track segment 18, or elsewhere along the track network.

Figure 6B:
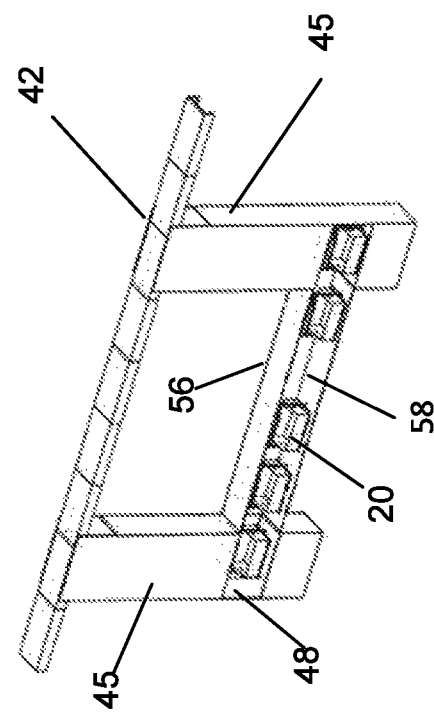
FIG. 6B schematically illustrates two vertical elevator shafts as shown in FIG. 6A connected by a horizontal conveyor shaft.
Figure 6A:
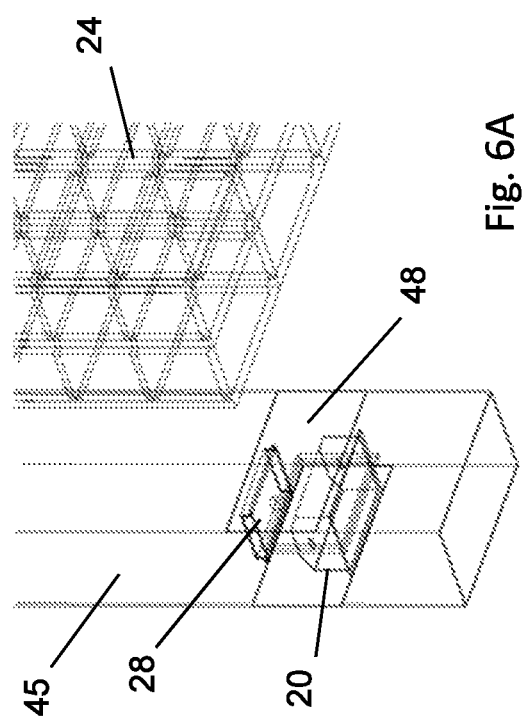
FIG. 6A schematically illustrates a vertical elevator shaft of the order fulfillment system shown in FIG. 5.

FIG. 6A schematically illustrates a vertical elevator shaft of the order fulfillment system shown in FIG. 5.

In the example shown, collection container 20 and an attached container mover 28 are removable from an overhead track network (e.g., overhead track network 41 or 55, or another overhead track network). In this example, vertical elevator shaft 45 includes an elevator mechanism (e.g., electrically or hydraulically operated) for lowering one or more collection containers 20 from the overhead track network to a lower opening 48 of vertical elevator shaft 45, and for raising the collection containers back to upper opening 46. In the example shown, collection container 20 and container mover 28 have been lowered within vertical elevator shaft 45 to lower opening 48.

In other examples, collection container 20 may be detachable from container mover 28 for lowering by the elevator mechanism, and may be reattached after being raised by the elevator mechanism.

FIG. 6B schematically illustrates two vertical elevator shafts as shown in FIG. 6A connected by a horizontal conveyor shaft.

In the example shown, two vertical elevator shafts 45 include elevator mechanisms for raising or lowering collection containers 20. The two vertical elevator shafts 45 are connected by lateral conveyor shaft 56. For example, lateral conveyor shaft 56 may include a conveyor belt or other conveyor mechanism for moving a collection container 20 from one of the connected vertical elevator shafts 45 to the other. In the example shown, lateral conveyor shaft 56 includes opening 58. For example, opening 58 may enable placement of items into a collection container 20 that is currently located within lateral conveyor shaft 56. Lateral conveyor shaft 56 may be utilized to convey a collection container 20 from a location near one stock location 24 to another, e.g., that are horizontally separated within a single stock cluster 23 or along a single aisle 19.

In the example shown, both vertical elevator shafts 45 are located alongside a single side branch track 42. In other examples, two vertical elevator shafts 45 may be located along different track segments, or along other parts of an overhead track network. In the example shown, lateral conveyor shaft 56 is horizontal. In other examples, a lateral conveyor shaft 56 may be sloped, bent, or curved. In the example shown, a single opening 58 extends along the entire length of lateral conveyor shaft 56. In other examples, the width of an opening 58 may be shorter than the length of lateral conveyor shaft 56, or may include several separated openings distributed along the length of lateral conveyor shaft 56. In the example shown, all illustrated collection containers 20 have been lowered to opening 58.

For example, a collection container 20 may be detached from its container mover 28 at the top of one of the connected vertical elevator shafts 45. After detachment, that container mover 28 may continue to travel along branch track 42. When collection container 20 is to be raised again, e.g., after filling, collection container 20 may be attached to another available container mover 28 at the other vertical elevator shaft 45. Such an arrangement may enable substantially continuous movement of container movers 28 along branch track 42 (e.g., except, possibly, for a brief pause to enable detachment or reattachment of collection container 20).

As another example, a segment of an overhead track, such as branch track 42, may be lowered to near a floor level. In some cases, when the segment is lowered, a replacement segment may be lowered to the level of the overhead track to enable continued movement of other collection containers 20 on that overhead track.

Figure 6C:
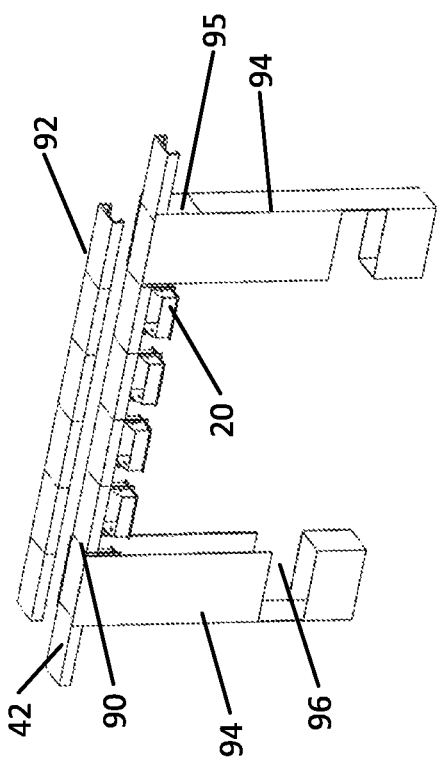
FIG. 6C schematically illustrates a lowerable track segment of an overhead track of an order fulfillment system when the track segment is fully raised.

FIG. 6C schematically illustrates a lowerable track segment of an overhead track of an order fulfillment system when the track segment is fully raised.

In the example shown, lowerable track segment 90 is raised to the level of an overhead track, represented by branch track 42. Replacement track segment 92 is shown as above the level of branch track 42. Collection containers 20 are shown as being currently suspended from lowerable track segment 90. A collection container 20 travelling along lowerable track segment 90 and branch track 42 may pass through vertical shaft 94 via upper opening 95.

Figure 6E:
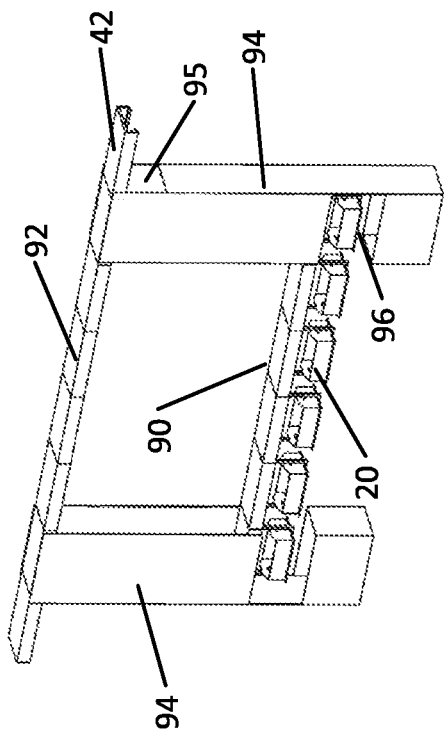
FIG. 6E schematically illustrates the lowerable track segment as shown in FIG. 6D when fully lowered.
Figure 6D:
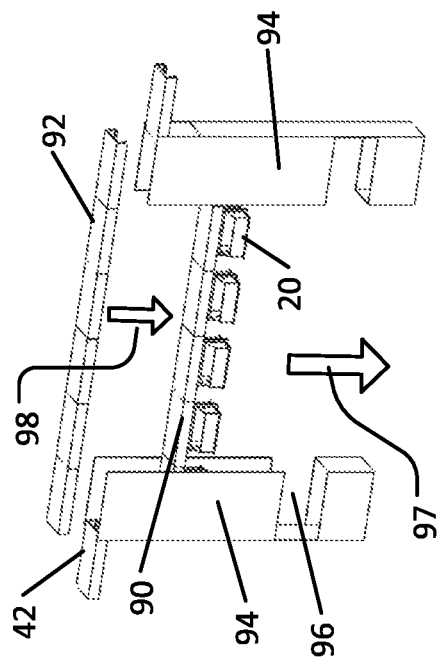
FIG. 6D schematically illustrates the lowerable track segment as shown in FIG. 6C as it is being lowered.

FIG. 6D schematically illustrates the lowerable track segment as shown in FIG. 6C as it is being lowered.

Lowerable track segment 90, with suspended collection containers 20, is shown as being lowered with lowering motion 97 from the overhead level of branch track 42. In the example shown, the ends of lowerable track segment 90 are being lowered, e.g., by an elevator mechanism, within vertical shafts 94.

In parallel with the lowering of lowerable track segment 90, or after a delay, replacement track segment 92 is lowered with lowering motion 98 from its raised position to the level of branch track 42. The lowering mechanism (not shown) for replacement track segment 92 is designed to prevent interference of the hoisting mechanism with motion of collection containers 20. For example, the lowering mechanism for replacement track segment 92 may include an upward extension of the elevator mechanism for raising and lowering lowerable track segment 90, may include a hoisting mechanism that is connected to an upper surface of replacement track segment 92, or another mechanism. Such a mechanism may be positioned so as not to impede motion of collection containers 20 that are suspended from lowerable track segment 90, when raised, or replacement track segment 92 when lowered.

FIG. 6E schematically illustrates the lowerable track segment as shown in FIG. 6D when fully lowered.

In the example shown, lowerable track segment 90 has been fully lowered. When lowerable track segment 90 is fully lowered, each collection container 20 that is suspended from lowerable track segment 90 is accessible to personnel or devices at a floor level, e.g., via lower shaft openings 96 or via a space between vertical shafts 94. Replacement track segment 92 has been lowered to the level of branch track 42, thus enabling a suspended collection container 20 to travel between segments of branch track 42 along replacement track segment 92.

When access to collection containers 20 that are suspended from lowerable track segment 90 is no longer required, replacement track segment 92 may be raised to above the level of branch track 42 (e.g., reversing lowering motion 98) and lowerable track segment 90 may be raised to the overhead level of branch track 42 (e.g., reversing lowering motion 97). When lowerable track segment 90 is raised, suspended collection containers 20 may be moved to another destination along the overhead track network. Controller 13 may be configured to prevent raising of replacement track segment 92 when collection containers 20 are suspended from collection containers 20. For example, any suspended collection containers 20 may be moved to another segment of branch track 42 or elsewhere prior to raising replacement track segment 92 to level above that of branch track 42. Similarly, controller 13 may be configured to prevent raising of lowerable track segment 90 to the level of branch track 42 until replacement track segment 92 has been raised to a level where replacement track segment 92 does not interfere with the raising of lowerable track segment 90.

Figure 7A:
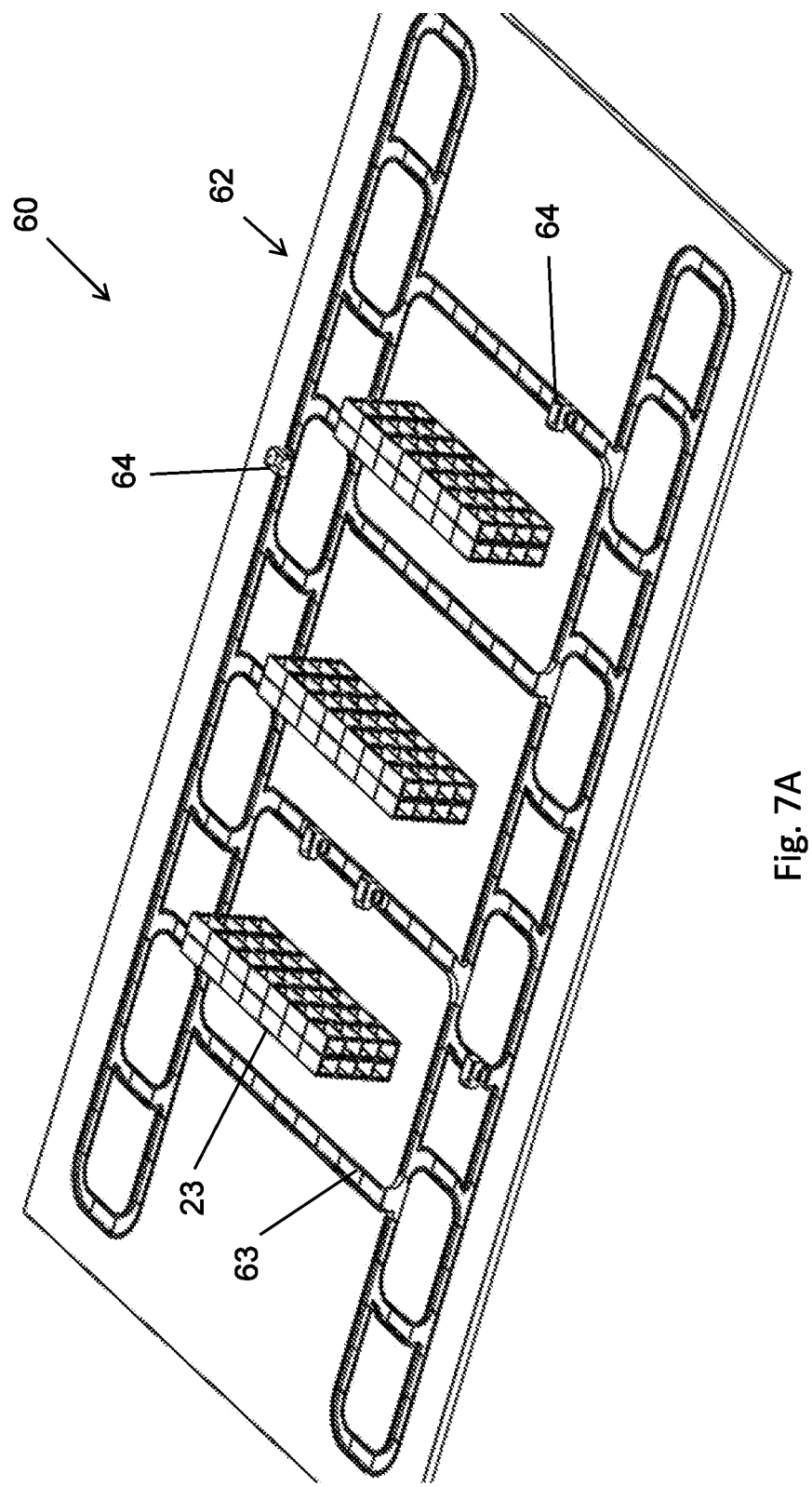
FIG. 7A schematically illustrates an example of an order fulfilment system with a floor level track.
Figure 7B:
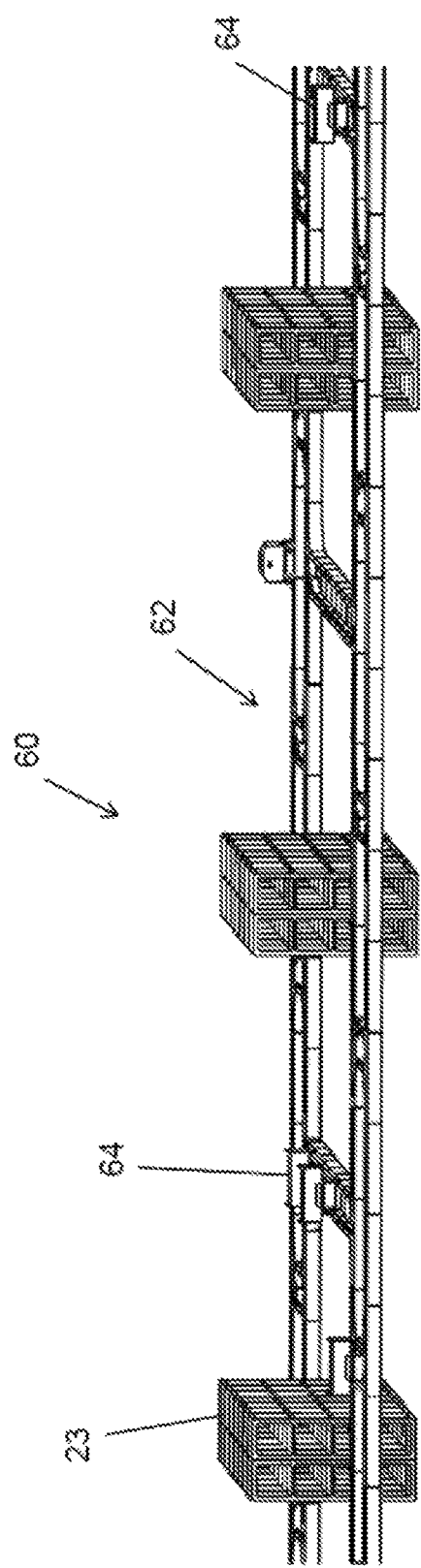
FIG. 7B schematically illustrates another view of the order fulfilment system shown in FIG. 7A.
Figure 7C:
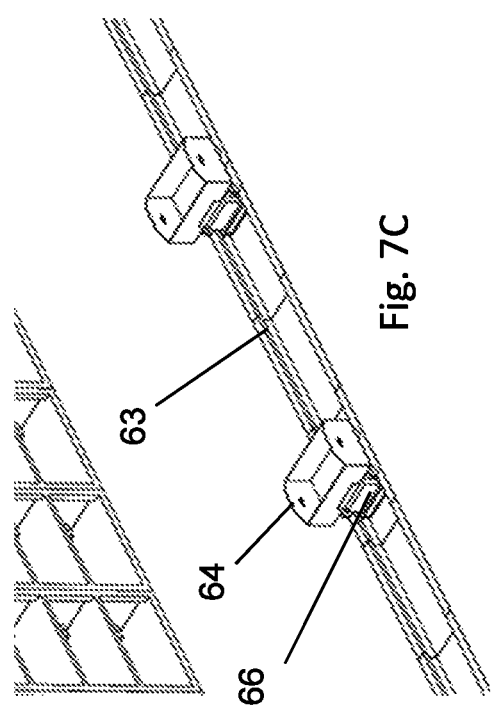
FIG. 7C schematically illustrates a collection container of the order fulfilment system shown in FIG. 7A.

FIG. 7A schematically illustrates an example of an order fulfilment system with a floor level track. FIG. 7B schematically illustrates another view of the order fulfilment system shown in FIG. 7A. FIG. 7C schematically illustrates a collection container of the order fulfilment system shown in FIG. 7A.

In the example shown, tracks 63 of floor-level track network 62 of order fulfillment system 60 is at floor level. A container mover 66 for moving a collection container 64 along floor-level track network 62 is propelled atop floor-level track network 62. As used herein, floor level refers to a height such that an ordered item may be placed into a collection container 64 that is located on floor-level track network 62 by a person standing on the floor, or by equipment that is mounted to the floor.

For example, a track 63 of floor-level track network 62 may include a double rail track, a monorail, a channel, a guidewire embedded in a floor, a cable, or other type of track along which a container mover 66 may be moved and guided. Floor-level track network 62 may include only single one-way tracks, as in the example shown, or two-way tracks (e.g., including a pair of opposite one-way tracks, with sufficient spacing between the pair to prevent collision between one collection container 60 or its contents and a collection container 60 traveling in the opposite direction, or its contents).

FIG. 8A schematically illustrates an example of an order fulfilment system with a track that is below floor level. FIG.

8B schematically illustrates a raised collection container of the order fulfilment system shown in FIG. 8A.

In order fulfillment system 70, recessed tracks 72 are located in recesses, or depressions, in a floor, e.g., of an aisle 19. Each container mover 76 is configured to move along a recessed track 72. A collection container 74 mounted atop container mover 76 by raisable support 78. In the example shown, each raisable support 78 may includes a pair of columns of variable length. For example, the columns may include telescoping elements, folding elements (e.g., with accordion folds), expandable elements, or may be otherwise extendible. In other examples, a raisable support may include a single column, more than two columns, or another support mechanism (e.g., suspension from an extendible mast, magnetic or pneumatic levitation, or otherwise).

When raisable support 78 is in a lowered state, collection container 74 may rest atop container mover 76 (e.g., similar to collection container 64 and container mover 66, as shown in FIG. 7C). For example, raisable support 78 may be lowered when order fulfillment system 70 is not in operation, e.g., during periods when shoppers or other unaffiliated people may be present in aisle 19 or in the vicinity of stock locations 24. In some cases, when raisable support 78 is lowered, the top of collection container 74 may be below floor level, enabling recessed tracks 72 to be covered. In other examples, the top of a lowered collection container 74 may be at or above the floor level. In some cases, raisable support 78 may be lowered whenever container mover 76 and collection container 74 are in motion. In such cases, raisable support 78 may be raised when ordered items are to be placed in collection container 74 from a nearby stock location 24. In some cases, e.g., when a collection container 74 is diverted to a side branch track 42 when being filled, all other parts of floor-level track network 62 may be covered to enable free movement of people over all of the other parts.

FIG. 9A schematically illustrates a parking area of an order fulfilment system with recessed tracks.

In the example shown, a parking area 80 is located on each side of recessed track 72. For example, a collection container 74 may be removed from recessed track 72 for placement in parking area 80, or parking area 80 may include a track onto which collection container 74 may be diverted. One or more collection containers 74 may be parked in each parking area 80. In the example shown, each parking area 80 is located near a stock cluster 23 on either side of recessed track 72. Thus, a human attendant or an automatic or remotely-operated item-handling device may place items from the nearest stock cluster 23 into the parked collection container 74. In other examples, a parking area 80 may be located elsewhere, e.g., for temporary storage of idle collection containers 74. Thus, placement of a collection container 74 in parking area 80 may enable free movement of other collection containers 74 over the remainder of the track network.

FIG. 9B schematically illustrates a layout of parking areas of an order fulfilment system with floor level tracks.

In the example shown, a parking area 80 is located on each side of a floor-level track 63. For example, a collection container 64 may be removed from track 63 for placement in parking area 80, or parking area 80 may include a track. One or more collection containers 64 may be parked along each parking area 80. In the example shown, each parking area 80 is located near a stock cluster 23 on either side of track 63. Thus, a human attendant or an automatic or remotely-operated item-handling device may place items from the nearest stock cluster 23 into the parked collection container 64. In other examples, a parking area 80 may be located elsewhere, e.g., for temporary storage of idle collection containers 64.

It should be noted that features that are described above with relation to one example of order fulfillment system may be applicable to others. In particular, various arrangements of tracks and junctions that are described in relation to one type of track network (e.g., overhead, floor-level, and recessed) are applicable to other types. Similarly, control of operation and movement of collection containers is generally similar for all described track networks (e.g., with the exception of operations related to raising and lowering of the containers that are particular to each arrangement).

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. An order fulfillment system comprising:
a plurality of stock locations, each stock location for storing one or a plurality of items;
one or a plurality of movable collection containers that are each configured to hold one or more of the items;
a network of tracks along which each of the collection containers is configured to move in a single direction, and including a plurality of junctions where at least two of the tracks intersect, each of the collection containers controllable at a junction of the plurality of junctions to continue travelling along one of said at least two of the tracks, the network of tracks configured to enable each of the collection containers to move to the plurality of stock locations; and
a controller configured to receive a list of ordered items, to determine a selected stock location of the plurality of stock locations at which each of the ordered items is stored, to calculate a route along the network of tracks to bring a collection container of said one or a plurality of movable collection containers to each selected stock location, and to control movement of that collection container along the calculated route to said each selected stock location,
wherein the network of tracks comprises overhead tracks,
wherein a collection container of said one or a plurality of movable collection containers is suspended by a suspension connector from a container mover that is configured to move along the overhead tracks,
wherein the suspension connector has a variable length, and
wherein the controller is configured to cause the suspension connector to be shortened to raise the suspended collection container when that collection container is being moved along an overhead track of the overhead tracks, and to cause the suspension connector to be lengthened to lower that suspended collection container when that collection container has been moved to one of the selected stock locations.

2. The system of claim 1, further comprising a barrier between the overhead tracks and the plurality of stock locations.

3. The system of claim 2, wherein the barrier includes one or a plurality of openings through each of which the suspended collection carrier is lowerable to a stock location of the plurality of stock locations.

4. The system of claim 2, further including one or a plurality of vertical shafts within each of which the suspended collection carrier is lowerable to a lower opening of the shaft.

\* \* \* \* \*